(12) United States Patent
Langhammer et al.

(10) Patent No.: US 8,612,772 B1
(45) Date of Patent: *Dec. 17, 2013

(54) SECURITY CORE USING SOFT KEY

(75) Inventors: Martin Langhammer, Salisbury (GB); James G. Schleicher, II, Los Gatos, CA (US)

(73) Assignee: Altera Corporation, San Jose, CA (US)

( * ) Notice: Subject to any disclaimer, the term of this patent is extended or adjusted under 35 U.S.C. 154(b) by 2022 days.

This patent is subject to a terminal disclaimer.

(21) Appl. No.: 11/490,764

(22) Filed: Jul. 20, 2006

Related U.S. Application Data

(63) Continuation-in-part of application No. 10/938,220, filed on Sep. 10, 2004.

(51) Int. Cl.
*H04L 9/32* (2006.01)

(52) U.S. Cl.
USPC .......................................... 713/190; 711/170

(58) Field of Classification Search
USPC .............................. 713/168, 189, 190; 726/34
See application file for complete search history.

(56) References Cited

U.S. PATENT DOCUMENTS

| | | | |
|---|---|---|---|
| 4,435,752 A | 3/1984 | Winkelman | |
| RE31,736 E | 11/1984 | Mueller et al. | |
| 4,609,986 A | 9/1986 | Hartmann et al. | |
| 4,617,479 A | 10/1986 | Hartmann et al. | |
| 4,642,487 A | 2/1987 | Carter | |
| 4,677,318 A | 6/1987 | Veenstra | |
| 4,706,216 A | 11/1987 | Carter | |
| 4,713,792 A | 12/1987 | Hartmann et al. | |
| 4,774,421 A | 9/1988 | Hartmann et al. | |
| 4,871,930 A | 10/1989 | Wong et al. | |
| 4,899,067 A | 2/1990 | So et al. | |
| 4,912,342 A | 3/1990 | Wong et al. | |
| 5,033,084 A | 7/1991 | Beecher | |
| 5,081,675 A | 1/1992 | Kittirutsunetorn | |
| 5,121,006 A | 6/1992 | Pedersen | |
| 5,148,485 A | 9/1992 | Dent | |
| 5,177,790 A | 1/1993 | Hazard | |
| 5,220,214 A | 6/1993 | Pedersen | |
| 5,260,610 A | 11/1993 | Pedersen et al. | |
| 5,260,611 A | 11/1993 | Cliff et al. | |
| 5,350,954 A | 9/1994 | Patel | |
| 5,371,422 A | 12/1994 | Patel et al. | |
| 5,375,240 A | 12/1994 | Grundy | |
| 5,388,157 A | 2/1995 | Austin | |
| 5,450,022 A | 9/1995 | New | |

(Continued)

OTHER PUBLICATIONS

Minnick, R.C., "A Survery of Microcellular Research," Journal of Association for Computing Machinery, vol. 14, No. 2, pp. 203-241, Apr. 1967.

(Continued)

*Primary Examiner* — Fikremariam A Yalew
(74) *Attorney, Agent, or Firm* — Weaver Austin Villeneuve & Sampson LLP

(57) ABSTRACT

Implementing a key and a protection circuit in a configurable device. A soft key associated with a protection circuit is combined with a user's electronic design in generating configuration data for download onto the configurable device. The placement and routing of the soft key is pseudo-randomly arranged with respect to the user's electronic design such that its placement and routing on the configurable device is substantially different for binary configuration data that is generated. Hiding the soft key and its connections to the protection circuit and assisting in protecting user electronic designs is achieved.

30 Claims, 8 Drawing Sheets

(Secure System)

(56) References Cited

U.S. PATENT DOCUMENTS

| | | | |
|---|---|---|---|
| 5,457,408 A | 10/1995 | Leung | |
| 5,459,673 A * | 10/1995 | Carmean et al. | 716/6 |
| 5,463,561 A * | 10/1995 | Razdan | 716/5 |
| 5,479,512 A | 12/1995 | Weiss | |
| 5,513,262 A | 4/1996 | Van Rumpt et al. | |
| 5,541,849 A * | 7/1996 | Rostoker et al. | 716/18 |
| 5,544,066 A * | 8/1996 | Rostoker et al. | 716/18 |
| 5,548,228 A | 8/1996 | Madurawe | |
| 5,553,002 A * | 9/1996 | Dangelo et al. | 716/11 |
| 5,563,592 A | 10/1996 | Cliff et al. | |
| 5,581,198 A | 12/1996 | Trimberger | |
| 5,594,793 A | 1/1997 | Bahout | |
| 5,636,281 A | 6/1997 | Antonini | |
| 5,748,744 A | 5/1998 | Levy et al. | |
| 5,757,908 A | 5/1998 | Cooper et al. | |
| 5,768,372 A | 6/1998 | Sung et al. | |
| 5,778,070 A | 7/1998 | Mattison | |
| 5,799,085 A | 8/1998 | Shona | |
| 5,802,376 A | 9/1998 | DeRoo et al. | |
| 5,828,753 A | 10/1998 | Davis | |
| 5,835,594 A * | 11/1998 | Albrecht et al. | 713/187 |
| 5,838,901 A | 11/1998 | Curd et al. | |
| 5,841,967 A * | 11/1998 | Sample et al. | 714/33 |
| 5,844,986 A | 12/1998 | Davis | |
| 5,867,395 A * | 2/1999 | Watkins et al. | 716/18 |
| 5,870,308 A * | 2/1999 | Dangelo et al. | 716/18 |
| 5,875,112 A * | 2/1999 | Lee | 716/12 |
| 5,889,266 A | 3/1999 | Schrenk | |
| 5,892,900 A | 4/1999 | Ginter et al. | |
| 5,903,578 A * | 5/1999 | De et al. | 714/726 |
| 5,915,017 A | 6/1999 | Sung et al. | |
| 5,963,454 A * | 10/1999 | Dockser et al. | 716/18 |
| 5,970,142 A | 10/1999 | Erickson | |
| 5,982,683 A | 11/1999 | Watson et al. | |
| 5,991,880 A | 11/1999 | Curd et al. | |
| 5,995,623 A | 11/1999 | Kawano et al. | |
| 6,012,033 A * | 1/2000 | Vanden Berge | 705/1 |
| 6,018,581 A * | 1/2000 | Shona et al. | 380/46 |
| 6,023,565 A | 2/2000 | Lawman et al. | |
| 6,026,220 A | 2/2000 | Cleereman et al. | |
| 6,102,961 A | 8/2000 | Lee et al. | |
| 6,102,963 A | 8/2000 | Agrawal | |
| 6,118,869 A | 9/2000 | Kelem et al. | |
| 6,120,549 A | 9/2000 | Goslin et al. | |
| 6,122,378 A | 9/2000 | Yoshiura et al. | |
| 6,157,317 A | 12/2000 | Walker | |
| 6,173,245 B1 | 1/2001 | Karchmer et al. | |
| 6,205,572 B1 * | 3/2001 | Dupenloup | 716/5 |
| 6,212,639 B1 * | 4/2001 | Erickson et al. | 726/26 |
| 6,216,255 B1 * | 4/2001 | Ito et al. | 716/6 |
| 6,216,258 B1 * | 4/2001 | Mohan et al. | 716/17 |
| 6,243,851 B1 * | 6/2001 | Hwang et al. | 716/10 |
| 6,246,254 B1 * | 6/2001 | Choukalos et al. | 326/8 |
| 6,263,483 B1 * | 7/2001 | Dupenloup | 716/18 |
| 6,289,498 B1 * | 9/2001 | Dupenloup | 716/18 |
| 6,292,931 B1 * | 9/2001 | Dupenloup | 716/18 |
| 6,308,299 B1 * | 10/2001 | Burch et al. | 716/4 |
| 6,317,872 B1 | 11/2001 | Gee et al. | |
| 6,324,672 B1 * | 11/2001 | Lawman et al. | 716/1 |
| 6,324,678 B1 * | 11/2001 | Dangelo et al. | 716/18 |
| 6,336,107 B1 | 1/2002 | Uchida et al. | |
| 6,346,427 B1 | 2/2002 | Gardner et al. | |
| 6,378,123 B1 * | 4/2002 | Dupenloup | 716/18 |
| 6,421,251 B1 | 7/2002 | Lin | |
| 6,446,243 B1 | 9/2002 | Huang et al. | |
| 6,467,072 B1 * | 10/2002 | Yang et al. | 716/16 |
| 6,480,027 B1 | 11/2002 | Ngai et al. | |
| 6,487,699 B1 | 11/2002 | Devins et al. | |
| 6,490,711 B2 * | 12/2002 | Buckley, Jr. | 716/5 |
| 6,507,592 B1 | 1/2003 | Hurvig et al. | |
| 6,536,028 B1 | 3/2003 | Katsioulas et al. | |
| 6,546,507 B1 | 4/2003 | Coyle et al. | |
| 6,557,020 B1 | 4/2003 | Amano et al. | |
| 6,557,159 B1 * | 4/2003 | Kutzschebauch et al. | 716/18 |
| 6,587,995 B1 | 7/2003 | Duboc et al. | |
| 6,609,244 B2 * | 8/2003 | Kato et al. | 716/18 |
| 6,633,788 B1 | 10/2003 | Riley et al. | |
| 6,647,494 B1 * | 11/2003 | Drews | 713/170 |
| 6,654,889 B1 * | 11/2003 | Trimberger | 713/191 |
| 6,658,045 B1 | 12/2003 | Jin | |
| 6,662,283 B1 | 12/2003 | Brun et al. | |
| 6,697,948 B1 | 2/2004 | Rabin et al. | |
| 6,708,322 B2 * | 3/2004 | Ito | 716/18 |
| 6,745,358 B1 * | 6/2004 | Watkins | 714/726 |
| 6,784,903 B2 * | 8/2004 | Kodosky et al. | 715/771 |
| 6,836,877 B1 * | 12/2004 | Dupenloup | 716/18 |
| 6,910,199 B2 * | 6/2005 | Sachs | 716/8 |
| 6,976,239 B1 * | 12/2005 | Allen et al. | 716/16 |
| 6,981,153 B1 | 12/2005 | Pang et al. | |
| 7,024,345 B1 * | 4/2006 | Stamm et al. | 703/14 |
| 7,107,569 B2 * | 9/2006 | Ito | 716/18 |
| 7,117,373 B1 | 10/2006 | Trimberger et al. | 713/193 |
| 7,131,091 B1 * | 10/2006 | Ganesan et al. | 716/6 |
| 7,197,647 B1 * | 3/2007 | Van Essen et al. | 713/189 |
| 7,218,251 B2 * | 5/2007 | Tsutsui et al. | 341/50 |
| 7,224,801 B2 * | 5/2007 | Abdo et al. | 380/270 |
| 7,242,766 B1 * | 7/2007 | Lyle | 380/2 |
| 7,409,652 B1 * | 8/2008 | Fox et al. | 716/4 |
| 7,434,065 B2 * | 10/2008 | Rodgers et al. | 713/189 |
| 7,454,323 B1 * | 11/2008 | Bain | 703/13 |
| 7,484,081 B1 * | 1/2009 | Langhammer et al. | 713/1 |
| 7,509,548 B2 * | 3/2009 | Mates | 714/726 |
| 7,581,117 B1 * | 8/2009 | Irving et al. | 713/189 |
| 7,647,575 B2 * | 1/2010 | Koga et al. | 716/12 |
| 2001/0001881 A1 * | 5/2001 | Mohan et al. | 716/1 |
| 2001/0021926 A1 | 9/2001 | Schneck et al. | |
| 2001/0032318 A1 * | 10/2001 | Yip et al. | 713/190 |
| 2001/0037458 A1 | 11/2001 | Kean | |
| 2001/0052072 A1 * | 12/2001 | Jung | 713/160 |
| 2002/0003435 A1 | 1/2002 | Andrews et al. | |
| 2002/0003436 A1 | 1/2002 | Andrews et al. | |
| 2002/0008540 A1 | 1/2002 | Britton et al. | |
| 2002/0010902 A1 | 1/2002 | Chen et al. | |
| 2002/0031166 A1 * | 3/2002 | Subramanian et al. | 375/130 |
| 2002/0112140 A1 * | 8/2002 | Miyamori | 712/1 |
| 2002/0138244 A1 * | 9/2002 | Meyer | 703/14 |
| 2002/0168067 A1 * | 11/2002 | Kouzminov | 380/201 |
| 2002/0199110 A1 * | 12/2002 | Kean | 713/189 |
| 2002/0199142 A1 | 12/2002 | Gefen | |
| 2003/0018630 A1 * | 1/2003 | Indeck et al. | 707/3 |
| 2003/0052710 A1 | 3/2003 | Lasselet Goldfinch | |
| 2003/0057996 A1 | 3/2003 | Lasselet Goldfinch | |
| 2003/0145286 A1 * | 7/2003 | Pajak et al. | 716/1 |
| 2003/0145297 A1 * | 7/2003 | Cote et al. | 716/6 |
| 2003/0188275 A1 * | 10/2003 | Meares | 716/4 |
| 2003/0208681 A1 * | 11/2003 | Muntz et al. | 713/179 |
| 2003/0221151 A1 | 11/2003 | Agarwal | |
| 2003/0229877 A1 * | 12/2003 | Bersch et al. | 716/16 |
| 2004/0000927 A1 | 1/2004 | Dante | |
| 2004/0010739 A1 | 1/2004 | Odom et al. | |
| 2004/0017221 A1 | 1/2004 | Agarwal | |
| 2004/0036500 A1 | 2/2004 | Bratt | |
| 2004/0044970 A1 * | 3/2004 | Anderson et al. | 716/1 |
| 2004/0080999 A1 | 4/2004 | Madurawe | |
| 2004/0119098 A1 * | 6/2004 | Or-Bach et al. | 257/202 |
| 2004/0145942 A1 | 7/2004 | Leijten-Nowak | |
| 2004/0194049 A1 | 9/2004 | Mizumaki | 716/17 |
| 2004/0243384 A1 * | 12/2004 | Chen et al. | 703/23 |
| 2005/0001652 A1 | 1/2005 | Malik et al. | |
| 2005/0071639 A1 * | 3/2005 | Rodgers et al. | 713/176 |
| 2005/0125642 A1 | 6/2005 | Kimura | |
| 2005/0182979 A1 * | 8/2005 | Gross et al. | 713/300 |
| 2005/0229128 A1 * | 10/2005 | Sripada | 716/6 |
| 2005/0246602 A1 | 11/2005 | Bahl et al. | |
| 2005/0254665 A1 * | 11/2005 | Vaudrey et al. | 381/72 |
| 2005/0280438 A1 * | 12/2005 | Park | 326/41 |
| 2005/0289355 A1 | 12/2005 | Kitariev et al. | |
| 2006/0055421 A1 | 3/2006 | Siemers | |
| 2006/0059345 A1 * | 3/2006 | Fayad et al. | 713/173 |
| 2006/0059368 A1 * | 3/2006 | Fayad et al. | 713/189 |
| 2006/0059369 A1 * | 3/2006 | Fayad et al. | 713/189 |
| 2006/0059372 A1 * | 3/2006 | Fayar et al. | 713/192 |
| 2006/0059373 A1 * | 3/2006 | Fayad et al. | 713/192 |
| 2006/0059574 A1 * | 3/2006 | Fayad et al. | 726/34 |

(56) References Cited

U.S. PATENT DOCUMENTS

| | | | |
|---|---|---|---|
| 2006/0146596 | A1 | 7/2006 | Madurawe |
| 2006/0197552 | A1 | 9/2006 | Lawson et al. |
| 2006/0209584 | A1 | 9/2006 | Devadas et al. |
| 2007/0011578 | A1 | 1/2007 | Lewis et al. |
| 2007/0124645 | A1* | 5/2007 | Ito et al. .................. 714/758 |
| 2007/0188188 | A1 | 8/2007 | Or-Bach et al. |
| 2007/0288765 | A1 | 12/2007 | Kean |
| 2008/0021888 | A1* | 1/2008 | Miller ......................... 707/3 |
| 2008/0030226 | A1 | 2/2008 | Goodnow et al. |
| 2008/0270805 | A1* | 10/2008 | Kean ........................... 713/189 |

OTHER PUBLICATIONS

Wahlstrom, S.E., "Programmable Logic Arrays—Cheaper by the Millions," Electronics, Dec. 11, 1967, pp. 90-95.
A. Mukhopadhyay, Recent Developments in Switching Theory, ed., Academic Press, Chapters VI-IX, pp. 229-254 and 369-422, 1971.
Langhammer et al., "Method and Apparatus for Protecting Designs In Sram-Based Programmable Logic Devices and the Like," U.S. Appl. No. 09/975,094, filed Oct. 10, 2001.
"A Developers Guide to the Design of MegaWizard® Megafunction Wizards," Documentation for Developers Provided with Final Product Release, Jun. 30, 1998.
"Altera Megafunctions," provided on Altera Corporation's World Wide Web Home Page (www.altera.com), prior to Jan. 11, 1999.
"AMPP Megafunction: Telephone Tone Generation Megafunction," Provided on Altera Corporation's World Wide Web Home Page (www.altera.com), prior to Jan. 11, 1999.
"Introduction to Megafunctions," provided on Altera Corporation's World Wide Web Home Page (www.altera.com), prior to Jan. 1998.
"Mega Wizard Plug-Ins," provided on Altera Corporation's World Wide Web Home Page (www.altera.com), prior to Jan. 11 1999.
Cooke, L.H., "VSIA—Its advantage four different perspectives", IEEE, 1997.
Draft Developer's Documentation sent to Developers with Sample Code for Testing, Jan. 26, 1998. ("MegaWizard® Plug-In Manager-Megafunction Wizards Information Exchange Requirements").

Gupta et al., "Introducing Core-Based System Design," Design & Test of Computers, IEEE, vol. 14, Issue: 4, pp. 15-25, 1997.
Hong et al., "Behavioral Synthesis Techniques for Intellectual Property Protection," Proceedings of the $36^{th}$ Annual Conference on Design Automation (DAC '99), pp. 849-854, 1999.
Intellectual property protection development working group, "Intellectual property protection: schemes, alternatives and discussion", Aug. 2000.
Kahng et al., "Watermarking techniques for intellectual property protection," Design Automation Conference, Jun. 1998.
Lach et al., "FPGA Fingerprinting Techniques for Protecting Intellectual Property," Proceedings of CICC, 4 pages, 1998.
Lach et al., "Robust FPGA Intellectual property protection through multiple small watermarks", ACM Jul. 1999.
Lach et al., "Signature hiding techniques for FPGA intellectual property protection," ACM 1998.
Langhammer et al., "Method and Apparatus for Limiting Use of Ip", Altera Corporation, U.S. Appl. No. 11/145,458, filed Jun. 2, 2005, pp. 1-35.
Michael Barr: "How Programmable Logic Works", Embedded Systems Programming, Jun. 1999, pp. 75-84. In the paragraph entitled: "Device Programming".
Molson et al., "Method and Apparatus for Providing a Protected Intellectual Property Hardware", Altera Corporation, U.S. Appl. No. 09/823,700, filed Mar. 30, 2001, pp. 1-30.
Molson et al., "Method and Apparatus for Providing Protected Intellectual Property", Altera Corporation, U.S. Appl. No. 11/372,599, filed Mar. 10, 2006, pp. 1-27.
PowerPoint® presentation describing "Megafunction Wizard" functionality made Nov. 1997.
Press Release from Altera Corporation, Altera's Mega Wizard Plug-Ins Offer the First Too-Independent Parameterized Logic Cores, Feb. 2, 1998.
U.S. Office Action dated Feb. 13, 2009, U.S. Appl. No. 10/938,220.
U.S. Office Action dated May 12, 2008, U.S. Appl. No. 10/938,220.
U.S. Office Action dated Oct. 28, 2009, U.S. Appl. No. 10/938,220.
U.S. Notice of Allowance dated Jun. 9, 2010, U.S. Appl. No. 10/938,220.

* cited by examiner (Secure System)

SECURITY CORE USING SOFT KEY

This application is a continuation-in-part of U.S. patent application Ser. No. 10/938,220, filed Sep. 10, 2004, entitled "Method And Apparatus For Protecting Designs In SRAM-Based Programmable Logic Devices And The Like" which is hereby incorporated by reference.

BACKGROUND

1. Field of the Invention

This invention relates generally to encryption. More specifically, this invention relates to implementing a soft key for use with a hard encryption core in programmable logic devices and similar configurable devices.

2. Description of Related Art

A programmable logic device (PLD) is a programmable integrated circuit that allows the user of the circuit, using software control, to customize the logic functions the circuit will perform. Programmable logic devices supplied by integrated circuit manufacturers like Altera Corporation of San Jose, Calif. are not inherently capable of performing any specific function. The user, in conjunction with software supplied by the PLD manufacturer, can program the PLD to perform the specific function or functions required by the user's application. The PLD then can function like a dedicated logic chip.

A typical PLD consists of an array of logic cells that can be individually programmed and interconnected to each other to provide internal input and output signals, thus permitting the performance of highly complex combinational and sequential logic functions. Users typically prepare electronic designs for a PLD using electronic design automation (EDA) software tools, usually provided by the chip vendor, to do technology mapping, partitioning and placement, routing and binary configuration data output generation. The resulting binary configuration data (representing the electronic design) can be programmed into a ROM connected to the PLD or downloaded to the PLD from a connected computer.

By the time the electronic design is created, it typically represents significant time, money and effort. To encourage individuals and companies to continue to invest in the research and development of new electronic designs, and to protect the investment represented by existing completed designs, it is desirable to provide some method of protecting the electronic designs from illegal or otherwise unauthorized copying or use, which has become a more acute problem in the field.

To make an illegal copy of the electronic design intended for a PLD, one need only make a copy of the binary configuration data. This can be done by copying the bit stream transmitted externally between the PLD and the device installing the configuration data, and then using the copied bit stream with a similar PLD. Thus, the copied electronic design can be illegally used with other programmable devices. It therefore is desirable to make it as difficult as possible to copy the binary configuration data that represents the electronic design.

Several techniques have been developed to address the illegal copying of programmable device electronic designs by users of PLDs. The goal of these techniques is to make it impossible (or at least much more difficult) to illegally copy electronic designs and other proprietary information or data. While these efforts have met with some success, they have some shortcomings. For example, some security mechanisms (e.g., encryption algorithms) have been implemented in soft logic where they are more susceptible to attack by reverse engineering from the exposed pins of the programmable device. As such, the binary configuration data can be modified to either remove a disable signal or to change the key to the encryption algorithm.

A technique that permits full use of an electronic design while protecting the proprietary interests of the owners of the intellectual property incorporated in such a design would represent a significant advancement in the art.

BRIEF SUMMARY OF THE INVENTION

To achieve the foregoing, and in accordance with the purpose of the present invention, a technique for integrating a protection circuit with an associated key embedded together with a user's electronic design is provided that makes it impossible (or at least much more difficult) to illegally copy an electronic design and other proprietary information or data associated with a configurable device. For example, a volatile soft key and a hard or soft protection circuit (e.g., a sequence generator, an encryption core, or authorization means) are implemented on a programmable device such that the placement and routing of the key with respect to the protection circuit and user's electronic design are obfuscated.

One aspect of the present invention provides a method for implementing a key associated with a protection circuit for a user electronic design. The user electronic design is received. An assignment to add the protection circuit to the user electronic design is also received. Furthermore, the key associated with the protection circuit is received. The key is combined with the user electronic design in forming a combined design. Configurable data is generated for programming a configurable device with the combined design.

Another aspect of the present invention provides a method for accessing a key associated with a protection circuit for a user electronic design. A configurable device is powered up. The configurable device is coupled to a secure device. The configurable device is programmed with configurable data. The configurable data is generated from a process that includes: (a) receiving the user electronic design; (b) receiving an assignment to add the protection circuit to the user electronic design; (c) receiving the key associated with the protection circuit; (d) combining the key with the user electronic design in forming a combined design; and (e) generating the configurable data with the combined design. The key is accessed. The key is authenticated with the secure device.

Another aspect of the present invention provides a system. The system includes a configurable device, a protection circuit, a configuration block, a secure device, and a communication link between the configurable device and the secure device. The configurable device includes a first key that is combined with a user electronic design and implemented as soft logic on the configurable device. The protection circuit includes a first encryption core. The protection circuit is implemented on the configurable device and arranged to return a first result of the first key operating on the first encryption core. The configuration block is implemented on the configurable device. The configuration block includes binary configuration data for the user electronic design. The secure device includes a second key implemented as hard logic on the secure device and a second encryption core that is identical to the first encryption core. The secure device is external to the configurable device and is arranged to return a second result of the second key operating on the second encryption core. The communication link is arranged to transmit the second result of the secure device to the protection circuit.

Accordingly, aspects of the present invention can be used for creating a secure application in a configurable device that does not have the ability to store the key in a non-volatile manner. In addition, the present invention can be used in situations where reprogramming the key is sought, such as to allow the configurable device to be used in other applications. Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
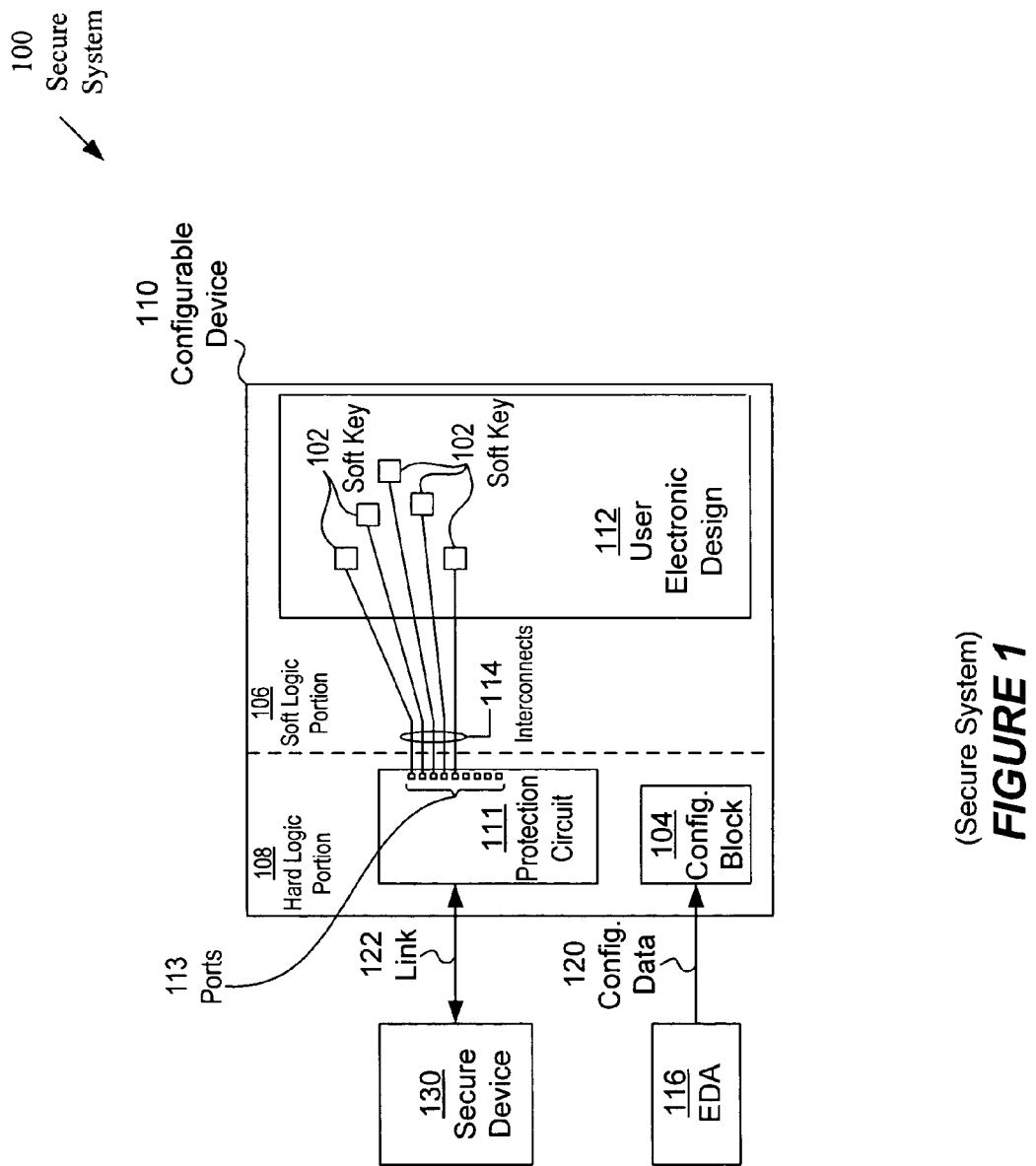
FIG. 1 illustrates a block diagram of a secure system having a soft key according to various embodiments of the present invention

The following detailed description of the invention will refer to one or more embodiments of the invention, but is not limited to such embodiments. The detailed description is intended only to be illustrative. Those skilled in the art will readily appreciate that the detailed description given herein with respect to the Figures is provided for explanatory purposes as the invention extends beyond these limited embodiments.

Embodiments of the present invention will be explained in connection with various specific devices, circuits, applications, etc., herein. These references, however, are for purposes of illustration only and are not intended to limit the present invention in any way. For example, one or more embodiments of the present invention will be explained using programmable logic devices (PLDs) to illustrate the present invention. However, the invention is widely applicable to other devices and in other environments. Moreover, embodiments of the present invention may be used in a wide variety of functions and applications.

Overview

Techniques and mechanisms for implementing a cryptographic key and a protection circuit in a configurable device are described herein. According to various embodiments, a soft cryptographic key associated with a protection circuit is combined with a user's electronic design in generating binary configuration data for download onto the configurable device. The placement and routing of the soft key is pseudo-randomly arranged with respect to the user's electronic design such that its placement and/or routing on the configurable device is substantially different for each time binary configuration data is generated, thus effectively hiding the soft key and its connections to the protection circuit and assisting in protecting user electronic designs and other proprietary information.

In this disclosure, a "configurable device" is a programmable logic device that ultimately contains user logic (that is, a user electronic design). Typically, such a device has a volatile memory and must be programmed upon each power-up, though not every configurable device must possess these characteristics. Examples of configurable devices include SRAM PLDs and RAM-based PLDs (for example, Altera FLEX and STRATIX devices).

A "secure device" is a non-volatile programmable device, a custom logic device, a microprocessor or other similar device from which an electronic design cannot be directly determined or read out (such as an Altera MAX device), and which installs user logic and possibly other functionalities into a configurable device from a configuration data memory (a "storage device"). A storage device may be a component separate and distinct from a secure device or the two devices may be integrated to some degree in a single component. Where a storage device and a secure device are distinct, the two devices are connected by a secure link to prevent copying of data transferred between the two devices.

The term "electronic design" generally refers to the logical structure of an integrated circuit or a portion of the circuit. During the design and development effort, an electronic design exists in various states or stages. These include a high level Boolean representation (encoded in a hardware design language for example), a schematic or circuit representation, or any other form representing the logical arrangement of a programmable device. In addition to the circuit structure and behavioral descriptions, the electronic design may specify other details such as floor-plan constraints, waveform constraints, timing constraints, fitting constraints, etc. At the gate level, it may exist as a netlist (whether synthesized or not) prior to placement on a target hardware device. In some cases, it may also include completed place and route assignments.

Any quantity that serves as an initialization value, an incremental value, a seed value, or an encryption algorithm unlocking/decoding value for the protection circuit is herein referred to as a key. The key can be implemented as a soft key (i.e., soft logic) or as a hard key (i.e., hard logic). For example, according to various embodiments of the present invention, a soft key is implemented as soft logic in a configurable device whereas a hard key is implemented as hard logic in a secure device.

To use a configurable device (such as an SRAM-based FPGA), a user creates an electronic design and then uses a software tool to convert the design into specific binary configuration data that can be stored in a storage device, such as an EEPROM. Upon startup, the storage device supplies the configuration data to the configurable device, typically under the control of a secure device, enabling the configurable device to perform the function of the programmed electronic design.

In some cases, the configuration data implements user logic to be used by the configurable device. The configuration data may also have other purposes and these are considered to be within the scope of the present invention. For example, either or both of the configurable device and the secure device might include an integrated microprocessor. Part of the configuration data may then be computer code used by the microprocessors. The microprocessors may implement the functionality of random number generators, encryption and decryption circuits, and comparators that might otherwise be implemented with logic. The actual user logic in the configurable device would still be implemented in the normal fashion—only the other configuration security circuits would be implemented with the microprocessors. Any appropriate manner of storing and using configuration data is deemed to fall within the scope of this invention.

Architecture of a Secure System

To further understand the techniques and mechanisms for implementing a soft key associated with a protection circuit, an understanding of the architecture of a secure system is helpful. Accordingly, FIG. 1 illustrates a block diagram of a secure system 100 having a soft key 102 according to various embodiments of the present invention. System 100 includes a configurable device 110 and a secure device 130. Configurable device 110 includes a protection circuit 111, configuration block 104, user electronic design 112, and soft key 102. Soft key 102 can be implemented within or separate from where the user electronic design 112 is implemented. Soft key 102 can be stored completely on one storage location or divided among multiple storage locations. As shown, soft key 102 and user electronic design 112 are implemented on the soft-logic portion 106 (e.g., FPGA fabric) whereas protection circuit 111 and configuration block 104 are implemented on a hard-logic portion 108. Hard-logic portion 108 typically includes hardwired logic, independent of specific functions programmed or otherwise implemented on specific devices, whereas soft-logic portion 106 includes "soft-logic" programmed into configurable device 110.

Configuration data 120 may be provided by any suitable source (for example, an EDA tool, ROM, or computer system on which the configuration data is stored), as will be appreciated by those skilled in the art. When embodiments of the present invention are used, portions of configuration data 120 may be openly readable, eliminating a costly and sometimes complicated step or function (for example, encryption of all of the configuration data) found in some earlier systems. Configuration data 120 is used to allocate the key in any number of storage locations (e.g., in a logic element, in a look-up table, or in a logic array block) in soft logic 106, to provide protection circuit 111 access to the key (e.g., by interconnecting the key to protection circuit 111), and to implement the user's electronic design 112 on configurable device 110.

Configurable device 110 contains the user's design 112 in a volatile manner and secure device 130 acts as a non-volatile authenticator. After programming the configurable device 110 (by first downloading configuration data 120 to a configuration block 104 via an EDA tool 116), configurable device 110 (via protection circuit 111) will send and receive messages and responses via communication link 122 to and from secure device 130. If the responses from secure device 130 match the expected values of configurable device 110, configurable device 110 continues to operate. If the wrong response is received, configurable device 110 performs a kill operation via protection circuit 111 and disables itself.

The authentication is kept secure by using encryption algorithms (such as DES or AES) in configurable device 110 and in secure device 130. Secure device 130 is configured to store a copy of the key to the protection circuit in a non-volatile manner while the configurable device stores a copy of the key to the protection circuit in a volatile manner. For more security than the conventional purely soft implementations on configurable devices, a hard protection circuit 111 (e.g., an encryption core, a sequence generator, or authorization means, etc.) is contained within configurable device 110 to control communication to external secure device 130 and to implement the kill control as determined by the protection circuit 111. In order for the hard protection circuit 111 to operate correctly, it has access to the key. For example, the key is provided by the user while creating the electronic design, or the key is accessed after the configuration data containing the key is programmed onto the configurable device. According to various embodiments of the present invention, the key is stored in a non-volatile manner within the users design and routed to ports 113 of protection circuit 111 via interconnects 114. The design flow and technique in which the key is implemented on the configurable device is further described below in FIGS. 3 and 4.

Figure 2:
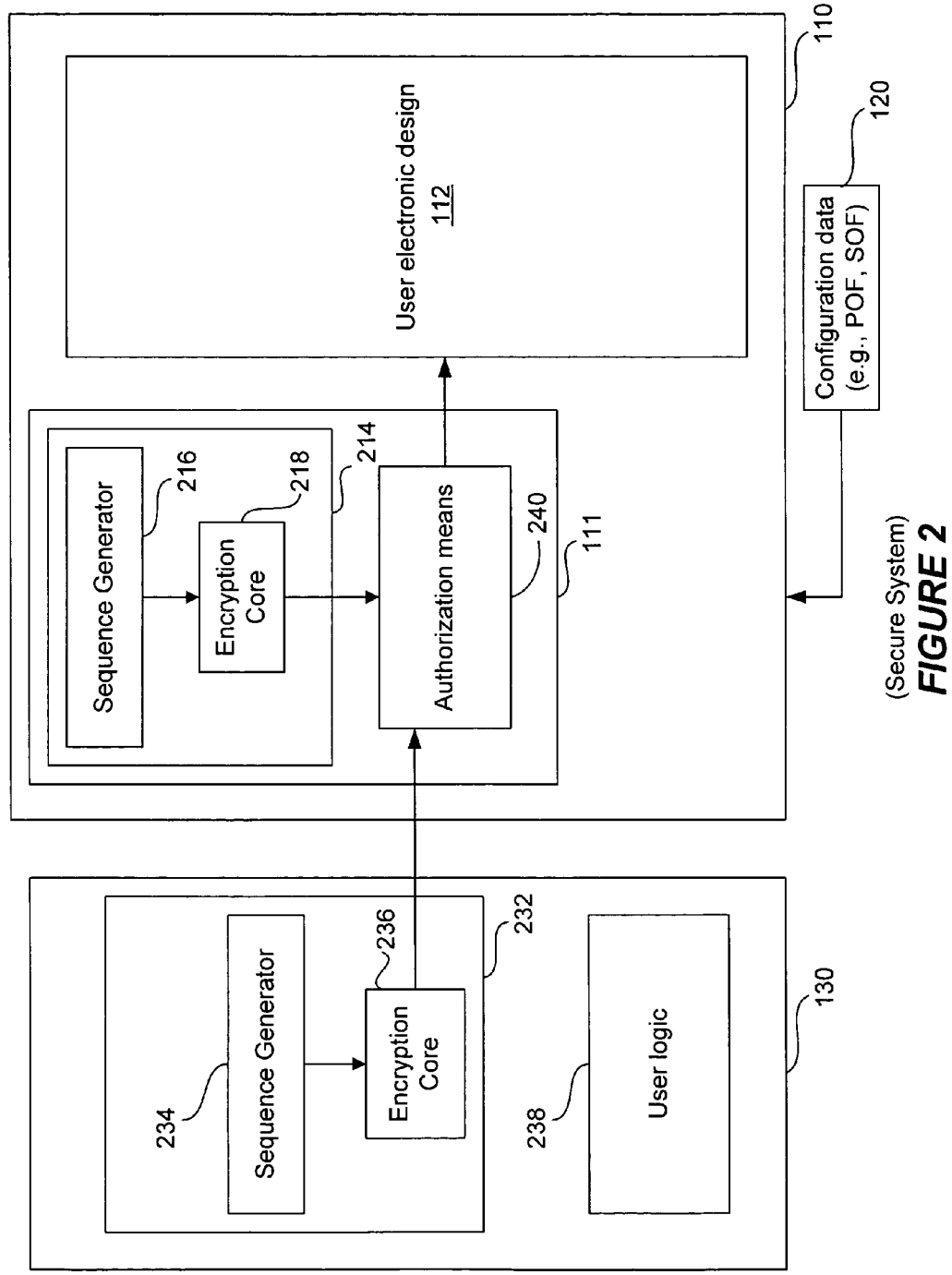
FIG. 2 illustrates another block diagram of a secure system that can be implemented with a soft key according to various embodiments of the present invention.

FIG. 2 illustrates a block diagram of another secure system that can be implemented with a soft key according to various embodiments of the present invention. As mentioned earlier, examples of configurable devices include SRAM PLDs and RAM-based PLDs (for example, Altera FLEX devices, STRATIX devices, other look up table based devices and any other suitable devices known or apparent to those skilled in the art). Essentially, aspects of the present invention operate on the principle that both a secure device 130 and the configurable device 110 implement and run identical authorization code generators that produce identical authorization codes which, unlike prior codes, are difficult or impossible to reproduce in order to operate the configurable device 110 in connection with a user's electronic design that is to be protected.

As shown in FIG. 2, protection circuit 111 includes a configurable device authorization code generator 214. Authorization means 240 for authorizing use of the user electronic design 112 (or configurable device 110) is coupled to both the electronic design 112 and the authorization code generator 214 and is used for verifying the devices' authorization codes and for enabling or disabling at least a portion of the configurable device 110 or user electronic design 112. Authorization means 240 may be a comparator or any other suitable enabling/disabling circuitry, device, structure or mechanism used for evaluating a plurality of input streams or signals coming from devices or structures coupled to means 240. The phrases "coupled to" and "connected to" and the like are used herein to describe a connection between two elements or components and are intended to mean coupled either directly together, or indirectly, for example via one or more intervening elements and, where possible, by wireless connection as well.

Because the configuration data is a bit stream made of millions and millions of bits, it is impractical for an unauthorized user to determine which bits are used to create aspects of the configurable device's protection circuit 111 (for example, connections to the authorization code generator 214 and authorization means 240) and to determine how to subvert embodiments of the present invention using such a configuration. The user electronic design 112 may either be enabled or disabled initially, in which case the authorization means 240 may include means for disabling or enabling operation of the electronic design 112, respectively.

In the embodiment of the present invention shown in FIG. 2, configurable device authorization code generator 214 includes a sequence generator 216 and an encryption core 218 coupled thereto. Sequence generator 216 can be any suitable generator of long sequences of numbers (for example, numbers having a long period such as $2^{64}$ or something comparable). Generator 216 may include a counter, a linear feedback shift register or any other pseudo random number generator meeting the need for long, non-repeating number sequences. The output numbers of the sequence generator 216 are provided to encryption core 218. Core 218 uses each number in the sequence generated as the seed or base for a different authorization code value. Thus, the output of core 218 is a sequence of values that are the output of the encryption algorithm used in core 218. If, for example, the period of the sequence generated by generator 216 is $2^{64}$, then the output of core 218 will contain that many different encrypted values, a substantial amount of highly randomized output used as authorization code for the protection of the user's electronic design. As noted below, additional steps may be taken to further reduce the chances of generating a predictable or repeatable sequence.

The encryption algorithm used can be any appropriate encryption algorithm, depending on the security needs of the system. Some encryption algorithms that might be useful include DES, triple DES, AES or any other encryption algorithms that can be used in these types of applications. Others are known to those skilled in the art. Depending on the application or use of the system, strong encryption may be desirable, though it is not necessary in every embodiment and environment in which the present invention might be used. In the embodiment shown in FIG. 2, the output of core 218 is the configurable device authorization code.

As will be appreciated by those skilled in the art, additional steps may be performed before or after operation of core 218. For example, after the encryption algorithm of core 218 has finished running for a given sequence value, the authorization code generated may be further manipulated in any appropriate way. In the configuration of FIG. 2, no other steps are shown and authorization means 240 can be a direct comparator. Whatever data is intended to be the authorization code for the configurable device 110 is transmitted to the comparator 240.

A secure device 130 also is provided in the illustrated system of FIG. 2. The secure device 130 typically is a CPLD such as a MAX or MAX II device manufactured and sold by Altera. In one embodiment of the present invention, the CPLD is a flash based CPLD utilizing a LUT (look-up table) based architecture, such as the Altera MAX II device. Other embodiments of the present invention may use an EEPROM CPLD like Altera's MAX device. Yet, other embodiments of the present invention may use a FPGA. Alternatively, an ASIC can be used as the secure device 130. The secure device 130 should be relatively secure from unauthorized copying or analysis. Devices that are programmed once and have this security attribute might include flash programmable devices and EEPROM programmable devices. Other devices may be suitable, as will be appreciated by those skilled in the art.

In the illustrative system of FIG. 2, secure device 130 includes a secure device authorization code generator 232 that is essentially identical to the configurable device's authorization code generator 214. Generator 232 includes a sequence generator 234 and encryption core 236 that are identical to the sequence generator 216 and core 218 found in the configurable device 110. This means that the outputs of generators 214 and 232 should be identical. Whenever the configurable device is powered up, it notifies the secure device to begin the authorization code generation process and to send the secure device's generated authorization code to the configurable device for verification.

As an example of operation of one embodiment of the present invention, when a counter is used as the sequence generator, the two sequence generators start with the same seed value and use the same increment value. Similarly, if the sequence generators are LFSRs (linear feedback shift registers), the same start value must be used, too. Moreover, the cores 218, 236 must use the same key or be otherwise related so that their outputs are identical or can otherwise be compared to verify authorization to use the user's electronic design 112. In some embodiments of the present invention, the key for authorization code generator 232 is implemented in hard logic whereas the key for authorization code generator 214 is provided by the user and stored in soft logic. In some embodiments of the present invention, comparison of the devices' authorization codes may simply involve having the authorization means check that they are identical. In other embodiments, additional manipulation and processing of the devices' codes may be performed.

FIG. 2 represents a simple implementation of the present invention in which the encrypted data stream from the secure device 130 likely is sufficiently secure to protect against unauthorized use or copying of the user's electronic design 112. When using encryption in this way, as will be appreciated by those skilled in the art, several cycles may be required to generate, encrypt and compare the authorization codes. In such cases, the system waits for the encryption algorithm to finish operating on the long sequence strings provided by sequence generators 216, 234.

One way to obtain the various identical values needed for the embodiment of the present invention shown in FIG. 2 is to take a user key in a form of a user string (for example, "Good morning, Dr. Chandra") and hash the user string. From the hash string so generated, numbers are taken to serve as initialization values, increment values, or encryption algorithm encoding/decoding values, etc. as needed. The hashed information is also used to select the output sequence of the encrypted bits, or to determine how many bits of the encrypted result are used. Even though a given number of output bits are created (for example, 64), it is not necessary to use all of them.

Like its twin in the configurable device 110, the output of sequence generator 234 is coupled to an encryption core 236 that is identical to core 218. The output of core 236, which is the authorization code for the secure device 130, is transmitted to the authorization means 240. The secure device 130 may also include user logic 238 or any other logic desired.

The configurable device authorization code (that is, the output of the configurable device authorization code generator 214) is transmitted to authorization means 240. The authorization means 240 is coupled to the user's electronic design 112 or any other programmable logic that a user seeks to implement and use on the configurable device 110 and wishes to protect. As mentioned above, in FIG. 2, the authorization means 240 can be a comparator configured to compare the bit streams from the configurable device authorization code generator 214 and from the secure device authorization code generator 232. For example, the comparator 240 may be an XOR gate or other easily implementable comparator. The authorization means 240 may include any other circuitry or control apparatus (for example, enabling and disabling circuitry) appropriate for performing the needed functions of the present invention. A comparator may be the authorization means of the system and, as will be appreciated by those skilled in the art, other types of authorization means can be used as appropriate. Such authorization means include means for comparing the devices' authorization codes as well as enabling/disabling means for controlling operability of the configurable device 110 or the user's electronic design 112.

If the bit streams do not match one another bit for bit, the user electronic design 112 is or remains disabled. This may be done by initially disabling the user electronic design 112 and only enabling it after authorization code verification, or by initially enabling the user electronic design 112 and sending a kill signal from the authorization means 240 if the authorization codes do not match. Specific methods and techniques for disabling a user's electronic design are not discussed in detail here, as those are well known to those skilled in the art.

Method for Implementing a Soft Key

Figure 3:
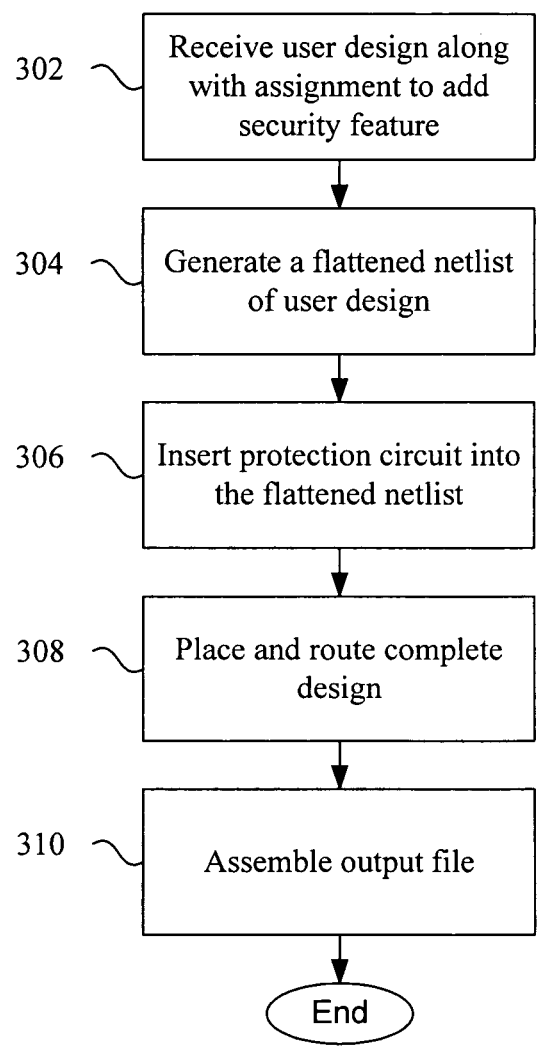
FIG. 3 is a flow diagram of a method according to one embodiment of the present invention by which a soft key is implemented on a configurable device.

FIG. 3 is a flow diagram of a method according to one embodiment of the present invention by which a soft key is implemented on a configurable device. In general, the flow diagram describes a technique by which aspects of the soft user key and protection circuit (e.g., access to the protection circuit) are automatically inserted into, and automatically compiled along with a user's electronic design. It should be appreciated that a variety of compilation techniques may be used with the various electronic design automation (EDA) tools, for PLD design as well for other types of integrated circuits.

At operation 302, a user's electronic design along with an assignment to add a security feature to the user's electronic design are received. For example, an EDA tool accepts the user electronic design files necessary to describe an electronic design for a device such as a PLD. These design files specify the design elements for the design. The assignment can be provided by any suitable manner. For instance, the assignment can be provided automatically or manually based on the nature of the electronic design, type of configurable device being used, or the user indicating a desire for such assignment. Once the assignment has been received, the user is queried for a key to the security feature (i.e., to the protection circuit). As such, operation 302 may also include receiving the key. The key will eventually be used to authenticate the authorized use of the electronic design on the configurable device.

At operation 304, a flattened netlist of the user's electronic design is generated. Operation 304 takes the user electronic design files and generates a flattened netlist representation of the user electronic design. In other words, should the design files include a hierarchy, this hierarchy is flattened out so that each entity referenced in the design is duplicated as many times as it is used. The representation of the user electronic design in this step is preferably a synthesized technology-mapped database that will be appreciated by those of skill in the art. It should be noted that this step can also be done after analysis and elaboration stage, but post technology mapping is preferred. At this point in the compile process, a synthesized netlist of the user electronic design has been created in a flattened state. Typically, generation of such a netlist is referred to as a synthesis operation in the compilation process, after elaboration has occurred.

At operation 306, a protection circuit is inserted into the flattened netlist. The insertion of the protection circuit into the flattened netlist can be done automatically (e.g., it can be triggered by the receipt of the assignment to add a security feature in operation 302). According to a preferred embodiment, insertion of the protection circuit includes identifying a protection circuit on the configurable device so that access to the key can be provided. For example, the protection circuit is identified as an atom in the electronic design. As such, generating interconnects between the protection circuit and the key is facilitated during placement and routing in operation 308. It should be noted that the protection circuit could either be a soft protection circuit (i.e., implemented as soft logic) or a hard protection circuit (i.e., implemented as hard logic).

The received key or identification of the protection circuit on the configurable device can be implemented as an encrypted core, which can be automatically inserted into the user's electronic design. Generally, cores are pre-programmed and pre-verified functional blocks for performing defined tasks in the electronic design. According to the various embodiments of the present invention, the core is dynamically generated. For example, one or more cores can be generated to contain the received key or aspects of the protection circuit as soon as the key is received in operation 302. In many cases, cores can be implemented on a target hardware device where they define at least a portion of the electronic design.

Operation 306 may include generating a gate level representation of the protection circuit. The protection circuit may take a wide variety of forms. By way of example, protection circuit 111 of FIG. 1 may be used, although it should be appreciated that a protection circuit may be implemented in many ways while still performing the functionality of the circuit shown in FIG. 1. In a preferred embodiment of the invention, a protection circuit core is included in the EDA tool so that a gate level representation may be produced automatically. Those of skill in the art will appreciate the process by which a gate level representation of a particular circuit is produced.

Operation 306 may also include connecting the gate level representation of the protection circuit to the flattened representation of the user's electronic design. This operation makes the logic connections from the protection circuit to the key stored in the soft logic. The EDA tool is able to combine the key with the user electronic design and to make the appropriate connection between the key and a port of the protection circuit.

At operation 308, placement and routing are performed. Since the inserted core is encrypted, specific flags can be added to the soft logic that will cause the placement and routing tool to hide the contents of the soft key. This means that no information about what is contained in the core will be generated for easy viewing.

For example, RTL & TechMap viewers will not show the logic, equations will not be written out, a Chip Editor will not show the content of those parts of the chip used by the core, and netlists containing the core will not be written out in unencrypted form.

In general, the soft key and the protection circuit should not communicate (or should at least minimize communications) with any of the other logic in the users design. This will make it more difficult for an unscrupulous user to find the key, thereby securing the user electronic design and other proprietary information or data. The placement tool (e.g., the fitter) will place the logic in the device. According to various embodiments, the fitter will be operable to obfuscate the placement of the key within the user electronic design. Any technique may be used to produce such obfuscation. For example, flags on the soft key (e.g., on the core) can force the fitter to deliberately spread the logic out and intermingle the placement with user logic.

After placement, the router is operable to connect the soft key to the protection circuit. The connection can be performed in a manner similar to the logic analyzer soft logic connection to the JTAG controller as described in U.S. patent application Ser. No. 08/958,435, filed Oct. 27, 1997, now U.S. Pat. No. 6,182,247, which is hereby incorporated by reference. According to one embodiment, the ports of the protection circuit are represented as special destinations in the fitter's routing graph for the device. If the protection circuit has several input ports to obscure which one is actually receiving the key, the router can be made to route dummy signals (via interconnects) to the fake inputs. This information would simply be encoded in the routing graph as specific destination types. The soft key would just connect to the appropriate destination types.

In operation 308, the combined design created in operation 306 is placed and routed in a fashion that will be appreciated by those of skill in the art. The output of the place and route operation is then input to operation 310 in which the output file is assembled. This output file (i.e., configuration data) may then be downloaded to a configurable device in order to program it. Once a configurable device has been programmed with this file, a user may begin use of the protection circuit and embedded keys to authenticate the authorized use of the user's electronic design.

Figure 4:
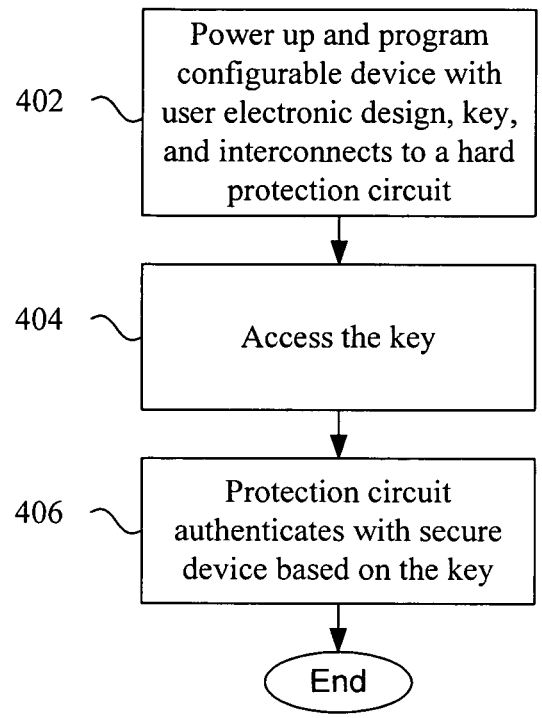
FIG. 4 is a flow diagram of a method according to one embodiment of the present invention in which the soft key is accessed on a configurable device.

Another method according to one embodiment of the present invention is shown in FIG. 4. FIG. 4 is a flow diagram of a method for accessing the soft key on a configurable device. This method can be used in connection with the systems of FIG. 1 or 2, for example, with some variations if desired, as will be appreciated by those skilled in the art. At operation 402, the configurable device is powered up and configured with the user electronic design, key, and interconnects to a hard protection circuit, which in this embodiment includes the configurable device authorization means.

At operation 404, the hard protection circuit accesses the soft key. Any suitable technique or mechanism for accessing the key may be used. For example, the hard protection circuit may perform a query for the key.

After the key is accessed, the protection circuit begins authentication with the secure device at operation 406. The secure device and configurable device both have authorization code generators that begin authorization code generation at once in this embodiment. Each secure device sequence value is generated. Thereafter, the secure device sequence value is encrypted to generate the secure device authorization code, after which the secure device authorization code is sent to the hard protection circuit on the configurable device.

Similarly, each configurable device sequence value is generated and is encrypted to generate the configurable device authorization code. Using the authorization means (for example, a comparator), the devices' authorization codes (their encrypted sequence values) are compared by verifying that the authorization codes are identical on a bitwise basis. If the codes are identical, then the operation of the configurable device (user electronic design) is authorized and enabled (if disabled initially) or continued (if enabled initially). If, on the other hand, the authorization codes are not identical, then the operation of the configurable device is disabled (if enabled initially) or not allowed to start (if disabled initially).

Programmable Logic Device Embodiment

The techniques and mechanisms of the present invention are applicable to integrated circuits that support programmability. Integrated circuits that are programmable by a user to produce a custom design include programmable logic devices (PLDs). Programmable logic devices refer to any integrated circuit that may be programmed to perform a desired function and include programmable logic arrays (PLAs), programmable array logic (PAL), field programmable gate arrays (FPGA), complex programmable logic devices (CPLDs), and a wide variety of other logic and memory devices that may be programmed. Some application specific integrated circuits (ASICs) also support some degree of programmability. Often, such PLDs are designed and programmed by a design engineer using an electronic design automation tool that takes the form of a software package.

Figure 5:
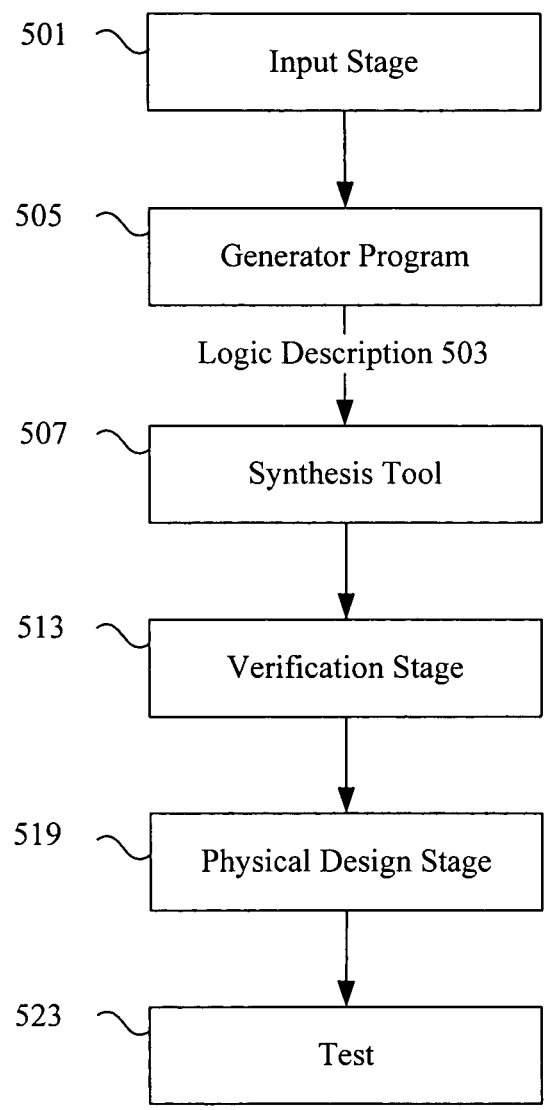
FIG. 5 is a flow diagram of a method for implementing a programmable logic device.

FIG. 5 is a flow diagram of a method for implementing a programmable logic device. An input stage 501 receives selection information typically from a user for logic such as a processor core as well as other components such as a multiplier, LUT, logic gates, barrel shifters, multiplexers, crossbars, or RAM to be implemented on an electronic device. A generator program 505 creates a logic description and provides the logic description along with other customized logic to any of a variety of synthesis tools, place and route programs, and logic configuration tools to allow a logic description to be implemented in an electronic device.

In one example, an input stage 501 often allows selection and parameterization of components to be used on an electronic device. In some examples, components provided to an input stage include intellectual property functions, megafunctions, and intellectual property cores. The components may be stored and retrieved from a library or database. The input stage 501 may be a graphical user interface using wizards for allowing efficient or convenient entry of information. The input stage may also be a text interface or a program reading a data file such as a spreadsheet, database table, or schematic to acquire selection information. The input stage 501 produces an output containing information about the various components selected.

In typical implementations, the generator program 505 can identify the selections and generate a logic description with information for implementing the various components. The generator program 505 can be a Perl script creating HDL files such as Verilog, Abel, VHDL, and AHDL files from the module information entered by a user. According to various embodiments, the generator program 505 also provides information to a synthesis tool 507 to allow HDL files to be automatically synthesized. In some examples, a logic description is provided directly by a designer. The HDL files may contain technology specific code readable only by a synthesis tool. The HDL files at this point may also be passed to a simulation tool.

As will be appreciated by one of skill in the art, the input stage 501, generator program 505, and synthesis tool 507 can be separate programs. The interface between the separate programs can be a database file, a log, or simply messages transmitted between the programs. For example, instead of writing a file to storage, the input stage 501 can send messages directly to the generator program 505 to allow the generator program to create a logic description. Similarly, the generator program can provide information directly to the synthesis tool instead of writing HDL files. On the other hand, input stage 501, generator program 505, and synthesis tool 507 can be integrated into a single program.

For example, SOPC Builder tool available from Altera Corporation, San Jose, Calif. integrates different stages of the electronic device implementation into a single program while implementing various techniques and mechanisms of the present invention. In particular, SOPC Builder tool provides system-level design flows for SOPC architectures. SOPC Builder tool may automatically generate interconnect logic (e.g., Avalon™ switch fabric) connecting components used in SOPC applications. The components include embedded processors that may either be internal or external to the FPGA and peripherals.

A user may select various components and an integrated program can then take the user selections and output a logic description in the form of a synthesized netlist without intermediate files. Any mechanism for depicting the logic to be implemented on an electronic device is referred to herein as a logic description.

According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 507.

A synthesis tool 507 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 513 typically follows the synthesis stage 507. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 513, the synthesized netlist file can be provided to physical design tools 519 including place and route and configuration tools. A place and route tool typically locates logic cells on specific logic elements of a target hardware device and connects wires between the inputs and outputs of the various logic elements in accordance with logic required to implement an electronic design. The device can also be physically tested at 523.

It will be appreciated by those skilled in the art that many of techniques/mechanisms of the present invention can be implemented in various design tools/stages. For example, operation 302 may be implemented in the input stage 501. Also, generating a flattened netlist of the user electronic design (operation 304 in FIG. 3) and inserting protection circuit into the flattened netlist (operation 306 in FIG. 3) can be implemented in synthesis tool 507. For another example, obfuscating the placement and routing of the keys (included in operation 308 in FIG. 3) and assembling the output file (included in operation 310 in FIG. 3) can be implemented in the physical design stage 519. Further, the techniques can either be partially or fully automated.

For programmable logic devices, a programmable logic configuration stage can take the output of the place and route tool to program the logic device with the user selected and parameterized components. According to various embodiments, the place and route tool and the logic configuration stage are provided in the Quartus Development Tool, available from Altera Corporation of San Jose, Calif.

As noted above, different stages and programs can be integrated in a variety of manners. According to one embodiment, the input stage 501, the generator program 505, the synthesis tool 507, the verification tools 513, and physical design tools 519 are integrated into a single program. The various stages are automatically run and transparent to a user. The program can receive the user-selected components, generate a logic description depicting logic for implementing the various selected components, and implement the electronic device. As will be appreciated by one of skill in the art, HDL files and EDF files are mere examples of a logic description. Other file formats as well as internal program representations are other examples of a logic description.

Figure 6:
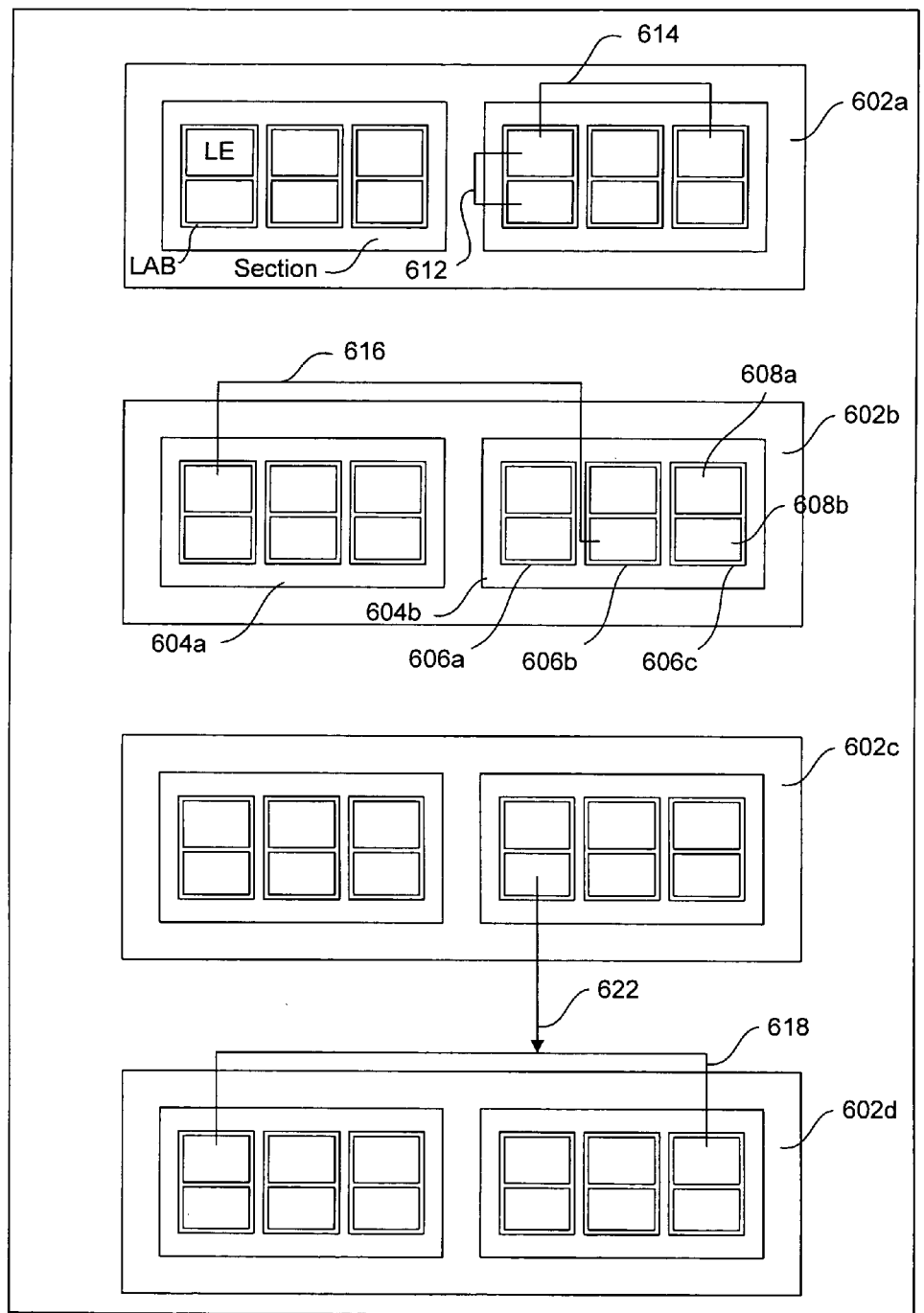
FIG. 6 is an idealized block representation of the architecture of an arbitrary hardware device, including interconnects, which may be employed in accordance with this invention.

The form of a compiled design according to one or more embodiments of the present invention may be further understood with reference to a hypothetical target hardware device having multiple hierarchical levels. Such a hardware device is represented in FIG. 6. This idealized representation roughly conforms to the layout of a FLEX 10K programmable logic device available from Altera Corporation of San Jose, Calif. In FIG. 6, a programmable logic device 600 is segmented into a plurality of "rows" to facilitate interconnection between logic elements on a given row. In the hypothetical example shown, there are four rows: 602a, 602b, 602c, and 602d.

Each row of programmable logic device 600 is further subdivided into two "half-rows." For example, row 602b is shown to contain a half-row 604a and a half-row 604b. The next lower level of the hierarchy is the "logic array block" (LAB). Half-row 604b, for example, contains three LABs: an LAB 606a, an LAB 606b, and an LAB 606c. Finally, at the base of the hierarchy are several logic elements. Each such logic element exists within a single logic array block. For example, LAB 606c includes two logic elements: a logic element 608a and a logic element 608b.

In short, PLD 600 includes four hierarchical levels: (1) rows, (2) half-rows, (3) LABs, and (4) logic elements (LEs). Any logic element within PLD 600 can be uniquely specified (and located) by specifying a value for each of these four levels of the containment hierarchy. For example, logic element 608b can be specified as follows: row (2), half-row (2), LAB (3), LE (2). To fit a logic design onto a target hardware device such as that shown in FIG. 6, a synthesized netlist is divided into logic cells (typically containing one or more gates) which are placed in the various logic elements as uniquely defined above. Thus, each logic cell from the synthesized netlist resides in a unique single logic element.

Often, a multi-level hardware hierarchy such as that shown in PLD 600 includes multiple levels of routing lines (interconnects). These connect the uniquely placed logic cells to complete circuits, including connecting the soft key to the hard protection device in accordance to various aspects of the present invention. In PLD 600, for example, four levels of interconnect are provided, one for each of the four hierarchy levels. First a local interconnect such as interconnect 612 is employed to connect two logic elements within the same LAB. At the next level, a LAB-to-LAB interconnect such as interconnect 614 is employed to connect two LABs within the same half-row. At the next higher level, a "global horizontal" interconnect is employed to connect logic elements lying in the same row but in different half-rows. An example of a global horizontal interconnect is interconnect 616 shown in row 602b. Another global horizontal interconnect is shown as interconnect 618, linking logic elements within row 602d. Finally, a "global vertical" interconnect is employed to link a logic element in one row with a logic element in a different row. For example, a global vertical interconnect 622 connects a logic element in the first LAB of the second half-row of row 602c to two separate logic elements in row 602d. In the embodiment shown, this is accomplished by providing global vertical interconnect 602 between the above-described logic element in row 602c to global horizontal interconnect 618 in row 602d. Consistent with the architecture of Altera Corporation's FLEX 10K CPLD, global vertical interconnects are directly coupled to the logic element transmitting a signal and indirectly coupled (through a global horizontal interconnect) to the logic elements receiving the transmitted signal.

In a target hardware device, there will be many paths available for routing a given signal line. During the routing stage, these various possible routing paths must be evaluated to determine which is best for the design being fit. The interconnect structure and overall architecture of the Altera FLEX 10K family of PLDs is described in much greater detail in U.S. Pat. No. 5,550,782, issued Aug. 27, 1996, naming Cliff et al. as inventors, and entitled "PROGRAMMABLE LOGIC ARRAY INTEGRATED CIRCUITS." That patent is incorporated herein by reference for all purposes. Additional discussion of the FLEX 10K and other PLD products may be found in other publications from Altera Corporation of San Jose, Calif.

Briefly, in the FLEX 10K architecture, there are at least three rows, with two half-rows per row, and twelve LABs per half-row. Each LAB includes eight logic elements each of which, in turn, includes a 4-input look-up table, a programmable flip-flop, and dedicated signal paths for carry and cascade functions. The eight logic elements in an LAB can be used to create medium-sized blocks of logic—such as 9-bit counters, address decoders, or state machines—or combined across LABs to create larger logic blocks. According to various embodiments of the present invention, the key provided by the user is stored in one or more look-up tables upon programming the programmable logic device.

It should be understood that the present invention is not limited to the Altera FLEX 10K architecture or any other hardware architecture for that matter. In fact, it is not even limited to programmable logic devices. It may be employed generically in target hardware devices as broadly defined above and preferably in application specific integrated circuit designs. PLDs are just one example of ASICs that can benefit from application of the present invention.

Figure 7:
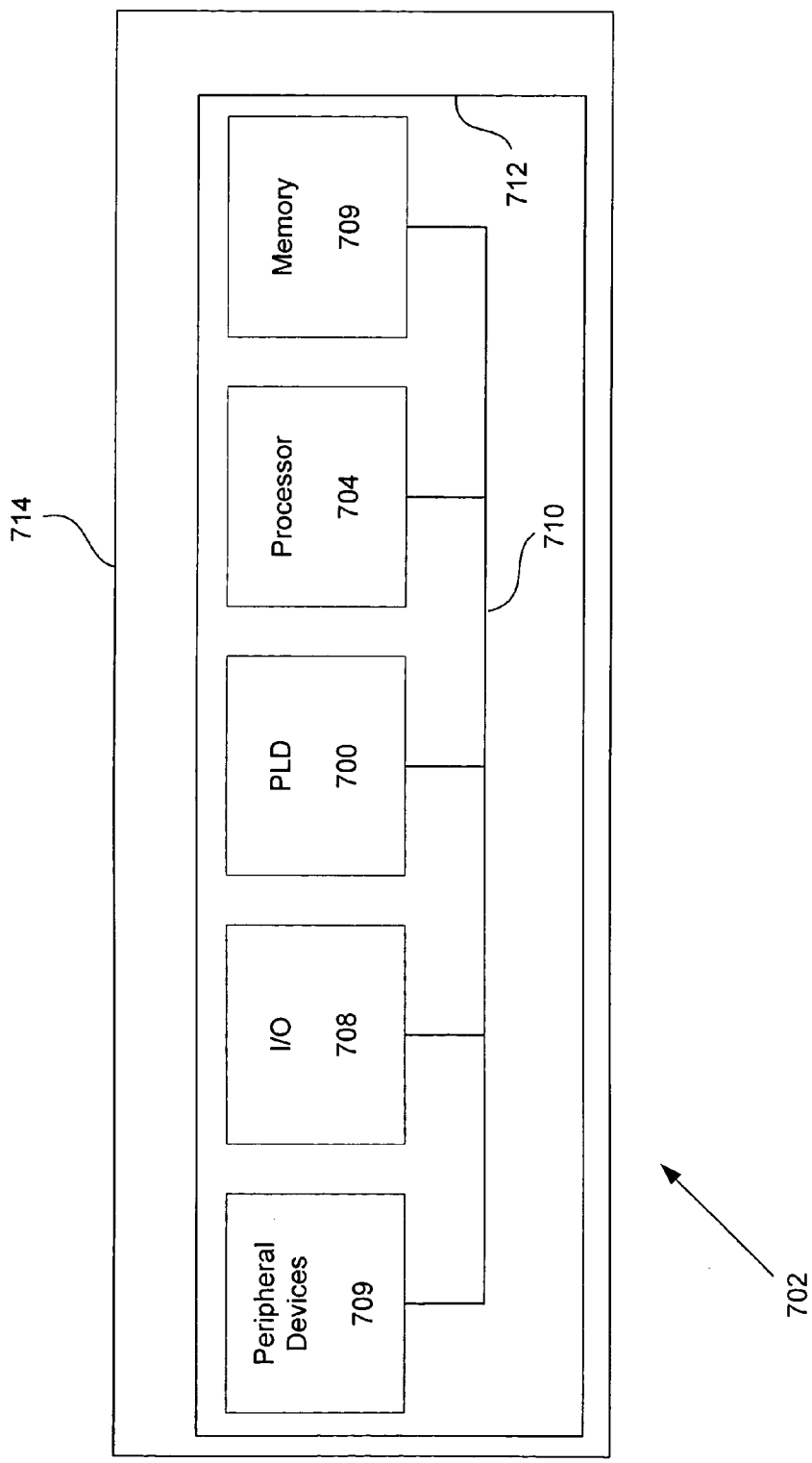
FIG. 7 is a block diagram depicting a system containing a PLD prepared in accordance with this invention.

The invention further relates to systems employing such programmable logic devices. FIG. 7 illustrates a PLD 700 of the present invention in a data processing system 702. The data processing system 702 may include one or more of the following components: a processor 704; memory 706; I/O circuitry 708; and peripheral devices 709. These components are coupled together by a system bus 710 and are populated on a circuit board 712 which is contained in an end-user system 714.

The system 702 can be used in a wide variety of applications, such as computer networking, data networking, instrumentation, video processing, digital signal processing, or any other application where the advantage of using reprogrammable logic is desirable. The PLD 700 can be used to perform a variety of different logic functions.

Computer System Embodiment

Figure 8:
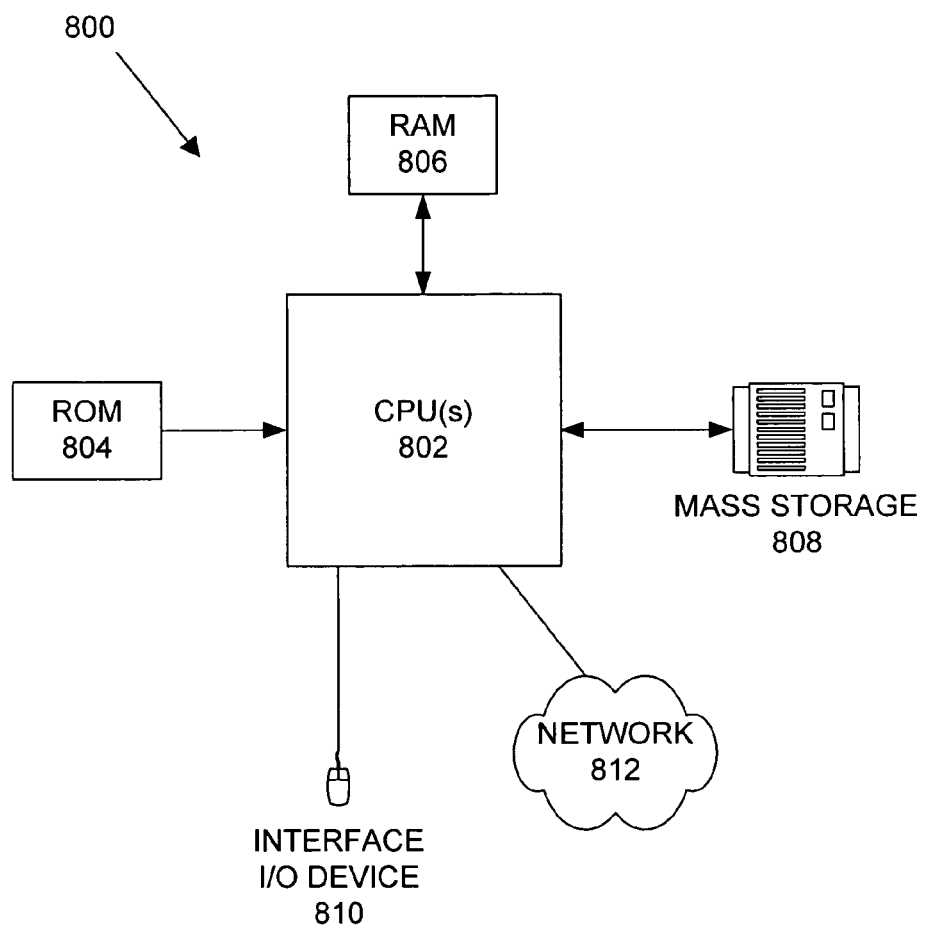
FIG. 8 is a block diagram of a typical computer system suitable for implementing various embodiments of the present invention.

This invention also relates to using a computer system according to one or more embodiments of the present invention. FIG. 8 illustrates a typical computer system that can be used in connection with one or more embodiments of the present invention. The computer system 800 includes one or more processors 802 (also referred to as central processing units, or CPUs) that are coupled to storage devices including primary storage 806 (typically a random access memory, or RAM) and another primary storage 804 (typically a read only memory, or ROM). As is well known in the art, primary storage 804 acts to transfer data and instructions uni-directionally to the CPU and primary storage 806 is used typically to transfer data and instructions in a bi-directional manner. Both of these primary storage devices may include any suitable computer-readable media described above, including a computer program product comprising a machine readable medium on which is provided program instructions according to one or more embodiments of the present invention.

A mass storage device 808 also is coupled bi-directionally to CPU 802 and provides additional data storage capacity and may include any of the computer-readable media described above, including a computer program product comprising a machine readable medium on which is provided program instructions according to one or more embodiments of the present invention. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM may also pass data uni-directionally to the CPU.

CPU 802 also is coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts.

The hardware elements described above may define multiple software modules for performing one or more steps and/or operations according to embodiments of the present invention. For example, instructions for running a design tool (e.g., EDA tool) or any other appropriate program may be stored on mass storage device 808 or 804 and executed on CPU 802 in conjunction with primary memory 806. In synthesizing a design from a simulation version, a user may use a compiler to generate the design for implementation on hardware.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation illustrated and described. Therefore, the described embodiments are illustrative and not restrictive, and the invention should not be limited to the details given herein but should be defined by the following claims and their full scope of equivalents, whether foreseeable or unforeseeable now or in the future.

We claim:

1. A method comprising:
 receiving a user electronic design;
 receiving an assignment to add a protection circuit to the user electronic design;
 receiving a first key associated with the protection circuit, wherein the protection circuit is used to perform a comparison between a result generated by using the first key with the protection circuit and a result generated by using a second key with a secure device;

combining, via a processor, the first key with the user electronic design in forming a combined design as soft logic on a configurable device including an integrated circuit; and generating configurable data for programming the configurable device with the combined design.

2. The method of claim 1, further comprising:
generating a flattened netlist of the user electronic design.

3. The method of claim 2, further comprising:
generating at least one core that contains the first key.

4. The method of claim 3, wherein the at least one core also contains an aspect of the protection circuit for facilitating connections between the first key and the protection circuit.

5. The method of claim 4, wherein the aspect of the protection circuit is selected from the group consisting of a location and a port of the protection circuit.

6. The method of claim 3, wherein the at least one core is encrypted.

7. The method of claim 3, wherein combining the first key with the user electronic design comprises:
inserting the at least one core to the flattened netlist of the user electronic design in forming the combined design.

8. The method of claim 7, wherein inserting at least one core to the flattened netlist of the user electronic design comprises generating a gate level representation of the protection circuit that is usable to combine with the flattened netlist.

9. The method of claim 3, further comprising:
performing placement and routing on the combined design.

10. The method of claim 9, wherein performing placement comprises:
identifying at least one core for obfuscation; and
obfuscating an arrangement of the first key within the user electronic design, the arrangement being associated with at least one storage location within the configurable device.

11. The method of claim 10, wherein identifying the at least one core for obfuscation comprises:
identifying a flag associated with the at least one core.

12. The method of claim 10, wherein obfuscating the arrangement of the first key within the user electronic design comprises:
pseudo randomly assigning a first storage location for the first key.

13. The method of claim 12, wherein obfuscating the arrangement of the first key within the user electronic design comprises:
pseudo randomly assigning a second storage location for the first key.

14. The method of claim 13, wherein the first and second storage locations are look-up tables (LUTs) in a soft logic portion of the configurable device.

15. The method of claim 9, wherein performing routing comprises:
generating interconnects between LUTs and the protection circuit.

16. The method of claim 15, wherein performing routing comprises:
obfuscating an input for the first key on the protection circuit.

17. The method of claim 16, wherein obfuscating an input for the first key on the protection circuit comprises:

routing a first interconnect to a first input port of the protection circuit, the first input port being a decoy receiver of the first key; and
routing a second interconnect to a second input port of the protection circuit, the second input port being an actual receiver of the first key.

18. The method of claim 1, wherein the protection circuit comprises an encryption core for which the first key is a corresponding encryption algorithm unlocking/decoding value.

19. The method of claim 1, wherein the protection circuit comprises a sequence generator for which the first key is a corresponding seed value.

20. The method of claim 1, wherein the protection circuit comprises a sequence generator for which the first key is a corresponding incremental value.

21. The method of claim 1, wherein the protection circuit comprises a comparator.

22. The method of claim 1, wherein the protection circuit is implemented on a hard logic portion of the configurable device.

23. The method of claim 1, wherein the configurable device is a programmable logic device.

24. A method comprising:
powering up a configurable device including an integrated circuit, the configurable device being coupled to a secure device;
programming the configurable device with configurable data, wherein the configurable data is generated from a process that includes:
receiving a user electronic design;
receiving an assignment to add a protection circuit to the user electronic design;
receiving a first key associated with the protection circuit, wherein the protection circuit is used to perform a comparison between a result generated by using the first key with the protection circuit and a result generated by using a second key with a secure device;
combining, via a processor, the first key with the user electronic design in forming a combined design as soft logic within the configurable device; and
generating the configurable data with the combined design;
accessing the first key; and
authenticating the first key with the secure device.

25. The method of claim 24, further comprising:
performing placement and routing on the combined design.

26. The method of claim 25, wherein performing placement comprises:
obfuscating an arrangement of the first key within the user electronic design, the arrangement being associated with at least one storage location within the configurable device.

27. The method of claim 26, wherein obfuscating the arrangement of the key within the user electronic design comprises:
pseudo randomly assigning a storage location for the first key.

28. The method of claim 27, wherein the storage location is a look-up table (LUT) in a soft logic portion of the configurable device.

29. A system, comprising:
a configurable device including a first key that is combined with a user electronic design and implemented as soft logic on the configurable device;

a protection circuit having a first encryption core, said protection circuit being implemented on said configurable device and arranged to return a first result of said first key operating on said first encryption core;

a configuration block implemented on said configurable device, said configuration block including binary configuration data for said user electronic design;

a secure device including a second key implemented as hard logic on the secure device and a second encryption core that is identical to the first encryption core, said secure device being external to the configurable device and being arranged to return a second result of said second key operating on said second encryption core; and a communication link between said configurable device and said secure device arranged to transmit said second result of said secure device to said protection circuit.

30. The system of claim 29, wherein the protection circuit is implemented as hard logic on the configurable device.

* * * * *